United States Patent
Pinarbasi (10) Patent No.: US 6,891,704 B2
(45) Date of Patent: May 10, 2005

(54) TUNNEL JUNCTION SENSOR WITH A SMOOTH INTERFACE BETWEEN A PINNED OR FREE LAYER AND A BARRIER LAYER

(75) Inventor: Mustafa Pinarbasi, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 10/692,977

(22) Filed: Oct. 24, 2003

(65) Prior Publication Data

US 2004/0085688 A1 May 6, 2004

Related U.S. Application Data

(62) Division of application No. 09/896,342, filed on Jun. 28, 2001, now Pat. No. 6,655,006.

(51) Int. Cl.[7] .............................................. G11B 5/39
(52) U.S. Cl. ............................... 360/324.2; 360/324.1; 360/324.11; 360/324.12
(58) Field of Search .......................... 360/324.1, 324.2, 360/324.11, 324.12

(56) References Cited

U.S. PATENT DOCUMENTS

| | | | |
|---|---|---|---|
| 4,741,967 A | 5/1988 | Yoshihara et al. | 428/469 |
| 5,764,567 A | 6/1998 | Parkin | 365/173 |
| 5,901,018 A | 5/1999 | Fontana et al. | 360/324.2 |
| 5,986,858 A | 11/1999 | Sato et al. | 360/113 |
| 6,181,537 B1 | 1/2001 | Gill | 360/324.2 |
| 6,219,274 B1 | 4/2001 | Shimazawa et al. | 365/158 |
| 6,242,086 B1 | 6/2001 | Song et al. | 428/336 |
| 6,275,363 B1 | 8/2001 | Gill | 360/324.2 |
| 6,296,741 B1 | 10/2001 | Pinarbasi | 204/192.11 |
| 6,353,318 B1 | 3/2002 | Sin et al. | 324/252 |
| 6,395,595 B2 | 5/2002 | Slaughter | 438/240 |
| 6,400,536 B1 | 6/2002 | Gill | 360/324.12 |
| 6,452,204 B1 | 9/2002 | Ishiwata et al. | 257/9 |
| 6,556,390 B1 * | 4/2003 | Mao et al. | 360/324.1 |
| 6,621,667 B1 * | 9/2003 | He et al. | 360/324.12 |
| 6,624,986 B2 * | 9/2003 | Gill | 360/324.12 |
| 6,655,006 B2 * | 12/2003 | Pinarbasi | 29/603.07 |
| 6,700,757 B2 * | 3/2004 | Pinarbasi | 360/324.12 |
| 2002/0054463 A1 * | 5/2002 | Mukoyama et al | 360/324.11 |
| 2004/0034991 A1 * | 2/2004 | Pinarbasi | 29/603.01 |
| 2004/0085688 A1 * | 5/2004 | Pinarbasi | 360/324.2 |

FOREIGN PATENT DOCUMENTS

| | | | |
|---|---|---|---|
| DK | 19813250 | 3/1998 | G11B/5/39 |
| DK | 19818547 | 4/1998 | H01F/10/00 |
| JP | 11054814 A | 2/1999 | H01L/43/08 |

* cited by examiner

Primary Examiner—William J. Klimowicz
(74) Attorney, Agent, or Firm—Ervin F. Johnston (57) ABSTRACT

A method of making provides a smooth surface of a pinned or free layer interfacing a barrier layer in a tunnel junction sensor wherein the smooth surface is an oxidized monolayer of the pinned or free layer. After sputter depositing the pinned or free layer the layer is subjected to an oxygen ($O_2$) atmosphere which is extremely low for a very short duration. In a preferred embodiment of the invention a partial thickness of the barrier layer is provided with a smooth surface by the same process after which a remainder thickness of the barrier layer is deposited and the barrier layer is exposed to oxygen ($O_2$) to form an oxide of the deposited metal.

12 Claims, 8 Drawing Sheets

TUNNEL JUNCTION SENSOR WITH A SMOOTH INTERFACE BETWEEN A PINNED OR FREE LAYER AND A BARRIER LAYER

REFERENCE TO RELATED APPLICATION

This application is a divisional application of application Ser. No. 09/896,342 filed Jun. 28, 2001, now U.S. Pat. No. 6,655,006.

BACKGROUND OF THE INVENTION

1. Field of the Invention

The present invention relates to a method of making a tunnel junction sensor with a smooth interface between a pinned or free layer and a barrier layer and, more particularly, to such a method which reduces a coupling field between the pinned and free layers.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm urges the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic field signals from the rotating disk. The read and write heads are connected to processing circuitry that operates according to a computer program to implement the writing and reading functions.

An exemplary high performance read head employs a tunnel junction sensor for sensing the magnetic field signals from the rotating magnetic disk. The sensor includes an insulative tunneling or barrier layer sandwiched between a ferromagnetic pinned layer and a ferromagnetic free layer. An antiferromagnetic pinning layer interfaces the pinned layer for pinning the magnetic moment of the pinned layer 90° to an air bearing surface (ABS) wherein the ABS is an exposed surface of the sensor that faces the rotating disk. The tunnel junction sensor is located between ferromagnetic first and second shield layers. First and second leads, which may be the first and second shield layers, are connected to the tunnel junction sensor for conducting a tunneling current therethrough. The tunneling current is conducted perpendicular to the major film planes (CPP) of the sensor as contrasted to a spin valve sensor where the sense current is conducted parallel to or parallel to the major film planes (CIP) of the spin valve sensor. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is parallel to the ABS, occurs when the tunneling current is conducted through the sensor without magnetic field signals from the rotating magnetic disk.

When the magnetic moments of the pinned and free layers are parallel with respect to one another the resistance of the tunnel junction sensor to the tunneling current ($I_T$) is at a minimum and when the magnetic moments are antiparallel the resistance of the tunnel junction sensor to the tunneling current is at a maximum. Changes in resistance of the tunnel junction sensor is a function of cos θ, where θ is the angle between the magnetic moments of the pinned and free layers. When the tunneling current ($I_T$) is conducted through the tunnel junction sensor resistance changes, due to field signals from the rotating magnetic disk, cause potential changes that are detected and processed as playback signals. The sensitivity of the tunnel junction sensor is quantified as magnetoresistive coefficient dr/R where dr is the change in resistance of the tunnel junction sensor from minimum resistance (magnetic moments of free and pinned layers parallel) to maximum resistance (magnetic moments of the free and pinned layers antiparallel) and R is the resistance of the tunnel junction sensor at minimum resistance. The dr/R of a tunnel junction sensor can be on the order of 40% as compared to 10% for a spin valve sensor.

Tunnel junction sensors are classified as either a top tunnel junction sensor or a bottom tunnel junction sensor. In a bottom tunnel junction sensor the pinning layer is closer to the first shield layer than the second shield layer and in a top tunnel junction sensor the pinning layer is closer to the second shield layer than to the first shield layer. In either type of sensor the first and second shield layers may engage the bottom and the top respectively of the tunnel junction sensor so that the first and second shield layers serve as leads for conducting the tunneling current through the tunnel junction sensor perpendicular to the major planes of the layers of the tunnel junction sensor. The tunnel junction sensor has first and second side surfaces which are normal to the ABS. First and second hard bias layers abut the first and second side surfaces respectively for longitudinally biasing the magnetic domains of the free layer. This longitudinal biasing maintains the magnetic moment of the free layer parallel to the ABS when the read head is in the quiescent condition.

An inherent characteristic of the tunnel junction sensor is the existence of a ferromagnetic or antiferromagnetic coupling field between the pinned and free layers across the barrier layer. Unfortunately, this coupling field urges the magnetic moment of the free layer from its parallel position to the ABS in the quiescent condition. Accordingly, it is desirable that the coupling field be minimized in the tunnel junction sensor. In the spin valve sensor this is accomplished by providing one or more thick oxide seed layers which improve the microstructure of the layers deposited thereon which, in turn, can be employed for minimizing the coupling field. Unfortunately, this approach cannot be employed in reducing the coupling field in a tunnel junction sensor since the tunneling current is conducted perpendicular to the major thin film planes of the sensor and the thick oxide seed layers would increase the resistance of the tunnel junction sensor to the tunneling current thereby reducing sensitivity of the sensor to field signals. Another approach to reduce the coupling field in a tunnel junction sensor is to increase the thickness of the oxide barrier layer. This increases the distance between the pinned and free layers so that the coupling field is reduced. Unfortunately, this approach is not practical since an increase in the thickness of the oxide barrier layer again increases the resistance of the sensor to the tunneling current which, in turn, reduces the sensitivity of the sensor. Accordingly, there is a strong-felt need to provide a tunnel junction sensor with a low resistance and a low coupling field.

SUMMARY OF THE INVENTION

The present invention provides a tunnel junction sensor with a low coupling field between the pinned and free layers and a low resistance to the tunneling current. This is accomplished by providing the pinned or free layer with a smooth surface where it interfaces the oxide barrier layer, depending upon whether the tunnel junction sensor is a bottom tunnel junction sensor or a top tunnel junction sensor. In a bottom tunnel junction sensor the pinned layer is provided with a smooth surface where it interfaces the oxide barrier layer and in a top tunnel junction sensor the free layer is provided with a smooth surface where it interfaces the oxide barrier layer. The smooth surface of either the pinned or free layer is accomplished by exposing the surface of the layer next to the barrier layer with oxygen. This oxidizes the top layer of atoms wherein the oxidation is a monolayer (one atom thick coverage) or less. It is important that the pinned or free layer not be oxidized throughout any further portion of its thickness since this will essentially destroy the operation of the pinned or free layer. Further, when multiple monolayers are oxidized this results in an increase in the resistance of the tunnel junction device.

The oxide barrier layer of the present invention is obtained by a method of making of the present invention in a sputtering chamber. After the ferromagnetic material of the pinned or free layer is deposited the ferromagnetic layer is exposed to oxygen ($O_2$) for a very short period of time and at a very low pressure. A preferred oxygen ($O_2$) partial pressure is $5 \times 10^{-5}$ Torr for a duration of 30 seconds. An acceptable range of oxygen ($O_2$) partial pressures is from $5 \times 10^{-6}$ Torr to $1 \times 10^{-3}$ Torr. The oxygen atoms that are adsorbed on the surface may be trapped during the next layer deposition or may float to the upper surfaces. Pressures and times that are too high will oxidize a thickness of the ferromagnetic layer rendering the sensor less sensitive or inoperable. The smooth ferromagnetic layer, whether it be a free layer or a pinned layer, enables a reduction in the thickness of the oxide barrier layer which, in turn, decreases the resistance of a tunnel junction sensor to the tunneling current and increases its sensitivity to field signals from the rotating magnetic disk.

In another embodiment of the invention the same method is employed for additionally providing a material layer for the oxide barrier layer with a smooth surface intermediate the beginning and ending of the sputter deposition of the material layer wherein the material layer is typically aluminum. While the smooth surface of the ferromagnetic pinned or free layer enhances the texture of the barrier layer, it is believed that this enhancement decreases with an increase in thickness of the barrier layer. Accordingly, by providing the aluminum layer with a smooth surface intermediate its sputtered thickness the enhancement of the texture of the aluminum layer is rekindled. This can be done multiple times throughout the thickness of the barrier layer. After completing the deposition of the full thickness of the aluminum layer it is oxidized to form aluminum oxide ($Al_2O_3$).

An object of the present invention is to provide a method of making a tunnel junction sensor with a low coupling field between free and pinned layers and a low resistance.

Another object is to provide a method of making a pinned layer or a free layer of a tunnel junction sensor with a smooth surface interfacing the barrier layer for improving the texture of the barrier layer so as to reduce a coupling field between the pinned and free layers and enable a barrier layer with a reduced thickness.

A further object is to accomplish the aforementioned objective as well as providing the barrier layer with a smooth surface intermediate a commencement and termination of its deposition for improving the texture of the barrier layer.

Still another object is to provide tunnel junction sensors made according to the aforementioned objectives.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
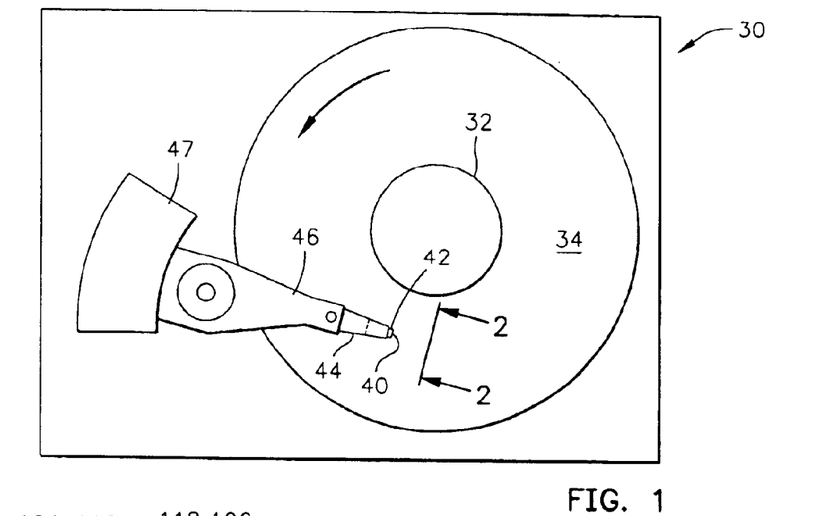
FIG. 1 is a plan view of an exemplary magnetic disk drive.
Figure 2:
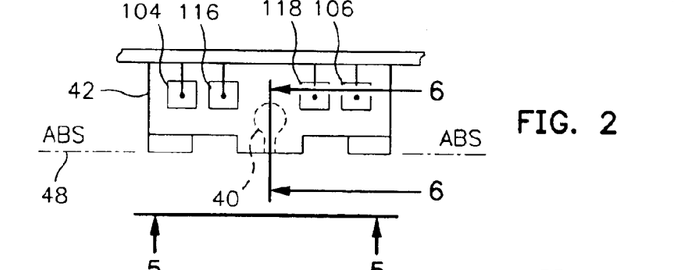
FIG. 2 is an end view of a slider with a magnetic head of the disk drive as seen in plane 2—2 of FIG. 1.
Figure 3:
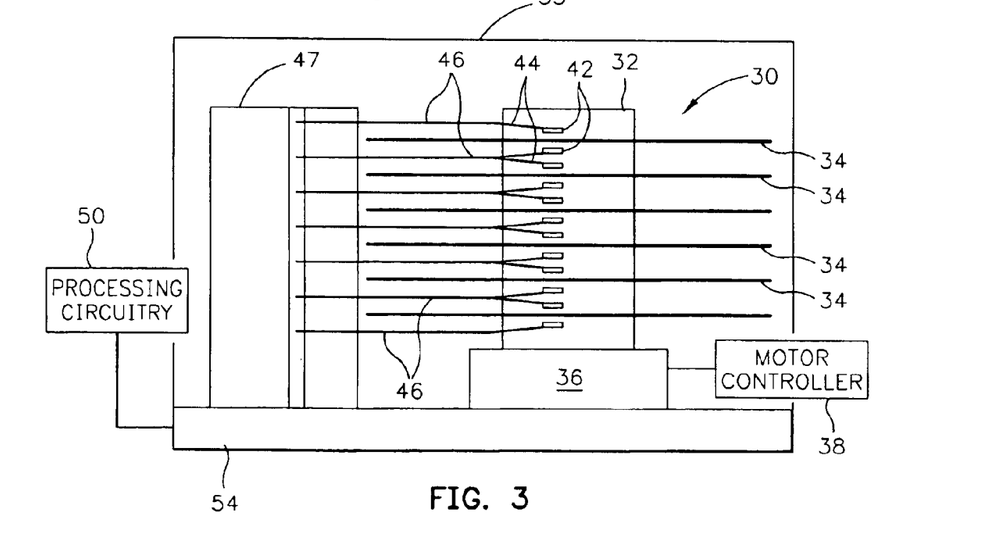
FIG. 3 is an elevation view of the magnetic disk drive wherein multiple disks and magnetic heads are employed.
Figure 4:
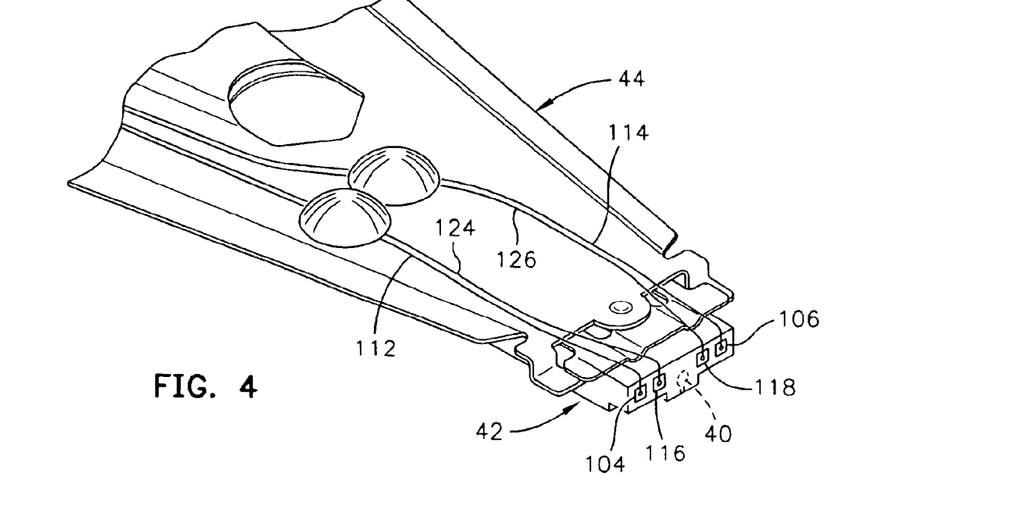
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates one or more magnetic disks 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
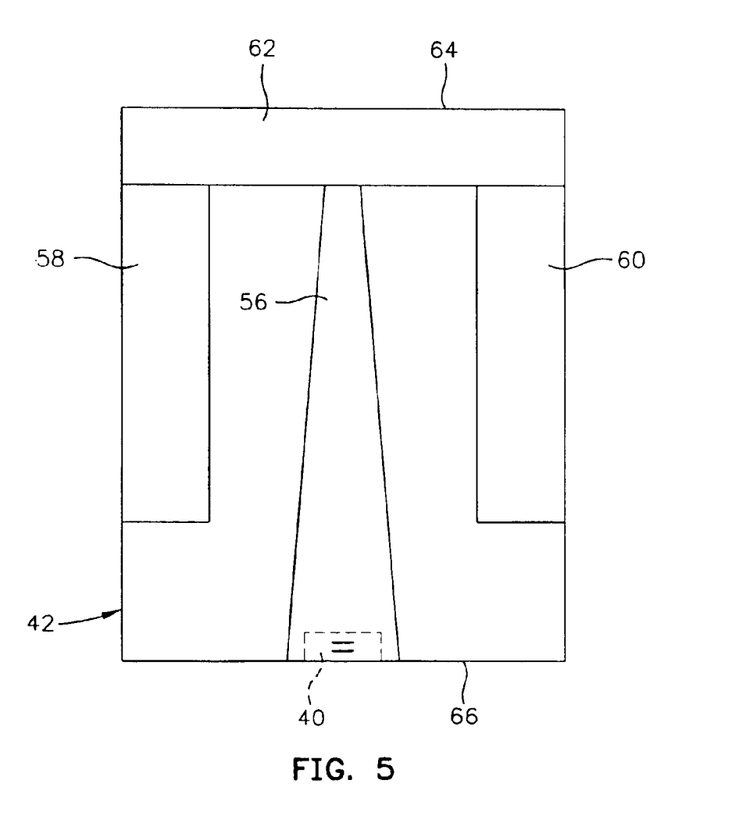
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
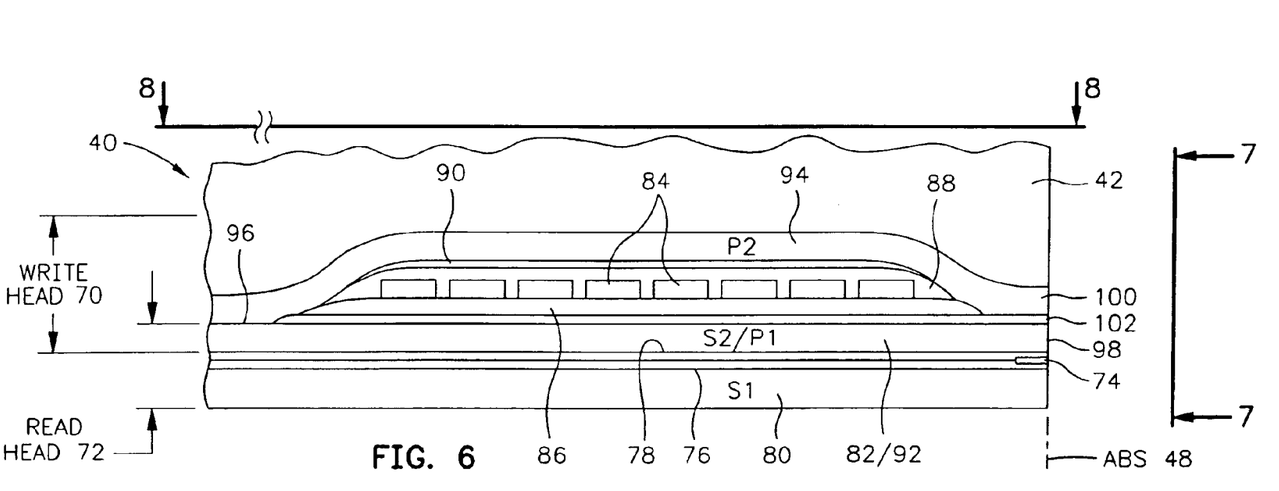
FIG. 6 is a partial view of the slider and a merged magnetic head as seen in plane 6—6 of FIG. 2.
Figure 7:
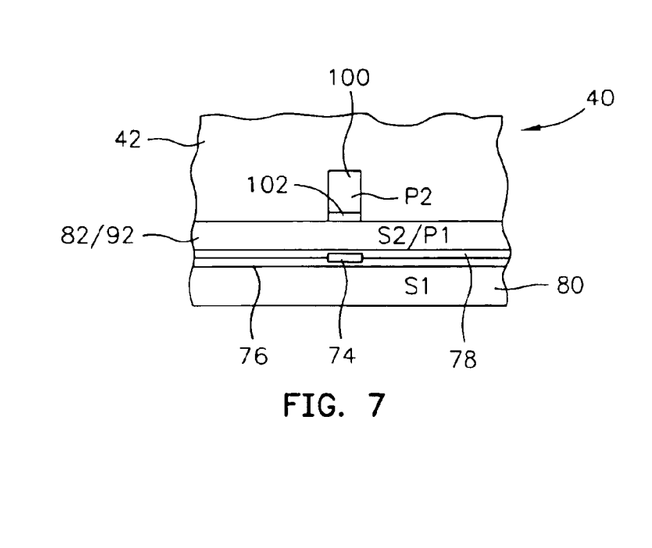
FIG. 7 is a partial ABS view of the slider taken along plane 7—7 of FIG. 6 to show the read and write elements of the merged magnetic head.

FIG. 6 is a side cross-sectional elevation view of a merged magnetic head 40, which includes a write head portion 70 and a read head portion 72, the read head portion employing a tunnel junction sensor 74 of the present invention. FIG. 7 is an ABS view of FIG. 6. The tunnel junction sensor 74 is sandwiched between ferromagnetic first and second shield layers 80 and 82. In response to external magnetic fields, the resistance of the spin valve sensor 74 changes. A tunneling current ($I_T$) conducted through the sensor causes these resistance changes to be manifested as potential changes. These potential changes are then processed as readback signals by the processing circuitry 50 shown in FIG. 3. The tunneling current ($I_T$) may be conducted through the tunnel junction sensor 74 perpendicular to the planes of its major film surfaces by the first and second shield layers 80 and 82 which serve as first and second leads.

Figure 8:
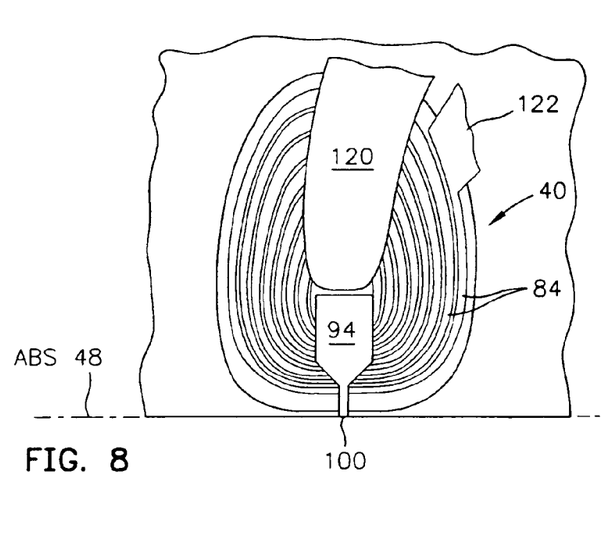
FIG. 8 is a view taken along plane 8—8 of FIG. 6 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. In a piggyback head (not shown) the second shield layer 82 and the first pole piece layer 92 are separate layers and an insulation layer is located therebetween. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
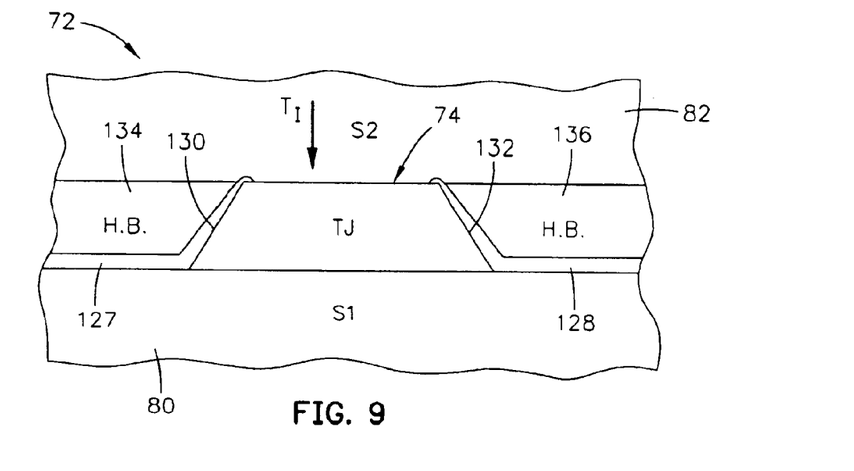
FIG. 9 is an enlarged ABS illustration of the tunnel junction read head.

FIG. 9 is an enlarged isometric ABS illustration of the read head 40 shown in FIG. 7. The read head 40 includes the tunnel junction sensor 74. First and second insulation layers 127 and 128, such as alumina ($Al_2O_3$), cover the first shield layer 80 on each side of the tunnel junction sensor 74 as well as slightly covering first and second side walls 130 and 132 of the sensor. First and second hard bias layers 134 and 136 are on the insulation layers 127 and 128 and are adjacent the side walls 130 and 132. The hard bias layers 134 and 136 cause magnetic fields to extend longitudinally through the sensor 74 for stabilizing the magnetic domains therein. The sensor 74 and the first and second hard bias layers 134 and 136 are located between ferromagnetic first and second shield layers 80 and 82 which may serve as leads for conducting the tunneling current $I_T$ through the sensor 74.

Figure 10:
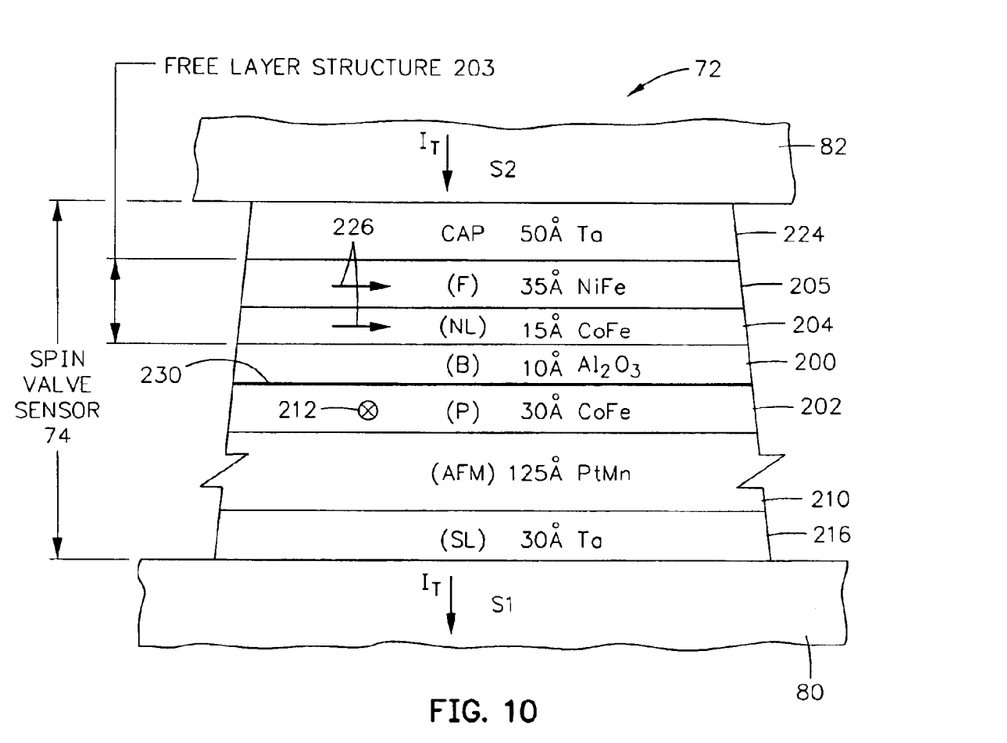
FIG. 10 is an enlarged ABS illustration of one embodiment of the present tunnel junction read head.

FIG. 10 is an enlarged ABS illustration of one embodiment of the present tunnel junction sensor 74 which is located between the first and second shield layers 80 and 82. The tunnel junction sensor 74, which is a bottom tunnel junction sensor, includes an oxide barrier layer (B) 200 which is located between a pinned layer (P) 202 and a free layer structure 203. The pinned layer 202 is preferably cobalt iron ($Co_{50}Fe_{50}$) which has a high magnetostriction so that after lapping the head the pinned layer 202 has a stress-induced anisotropy perpendicular to the ABS which supports an exchange coupling between a pinning layer 210 and the pinned layer 202. The pinning layer 210 pins a magnetic moment 212 of the pinned layer perpendicular to the ABS either out of the head or into the head as shown in FIG. 10. A seed layer of tantalum (Ta) 216 may be located between the pinning layer 210 and the first shield layer 80 for improving the microstructure of the layers of the tunnel junction sensor deposited thereon. The free layer structure 203 may include a nanolayer (NL) 204 of cobalt iron (CoFe) and a free layer (F) 205 of nickel iron (NiFe). A cap layer 224 of tantalum (Ta) may be located on the free layer structure 203 for protecting the free layer structure from subsequent processing steps.

The free layer structure 203 has a magnetic moment 226 which is directed from right to left or from left to right, as shown in FIG. 10. When a field signal from the rotating magnetic disk rotates the magnetic moment 226 of the free layer structure into the head the magnetic moments 226 and 212 become more parallel which reduces the magnetoresistive coefficient dr/R of the head and when the field signal rotates the magnetic moment 226 out of the head the magnetic moments 226 and 212 become more antiparallel which increases the magnetoresistive coefficient dr/R of the head. These resistance changes are processed as playback signals by the processing circuitry 50 in FIG. 3.

Exemplary thicknesses of the layers are 30 Å of tantalum (Ta) for the seed layer (SL) 216, 150 Å of platinum manganese ($Pt_{50}Mn_{50}$) for the pinning layer 210, 30 Å of cobalt iron ($Co_{50}Fe_{50}$) for the pinned layer 202, 10 Å of aluminum oxide ($Al_2O_3$) for the barrier layer 200, 15 Å of cobalt iron ($Co_{90}Fe_{10}$) for the nanolayer 204, 35 Å of nickel iron ($Ni_{83}Fe_{17}$) for the free layer 205 and 50 Å of tantalum (Ta) for the cap layer 224.

According to the present invention the pinned layer 202 has a smooth surface 230, represented by a heavy line, which interfaces the barrier layer 200. The smooth surface 230 is an oxidized monolayer of the ferromagnetic material of the pinned layer which is preferably cobalt iron (CoFe). The monolayer has the thickness of an atom. An additional thickness of the pinned layer should not be oxidized since this will reduce the effectiveness of the pinned layer 202 and increase the roughness of the surface of the pinned layer where it interfaces the barrier layer 200. The smooth surface 230 is obtained by a method according to the present invention which will be described in detail hereinafter.

Figure 11:
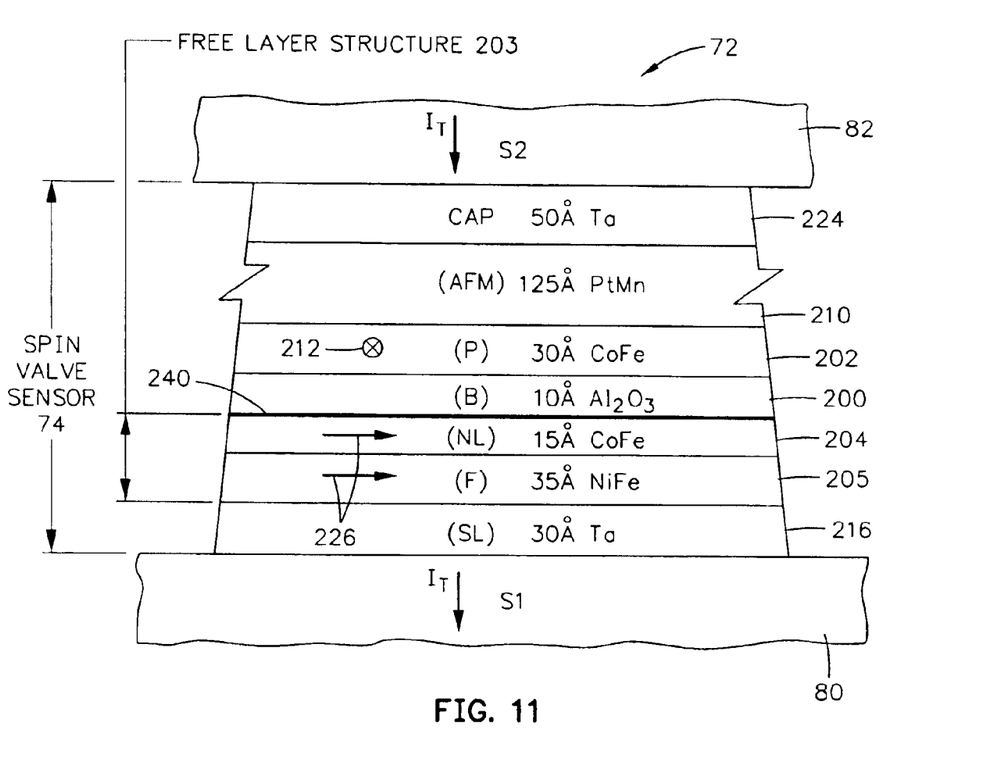
FIG. 11 is an enlarged ABS illustration of another embodiment of the tunnel junction read head.

The tunnel junction sensor 74 in FIG. 11 is the same as the tunnel junction sensor 74 in FIG. 10 except the layers 210, 202, 200, 204 and 205 have been inverted. The tunnel junction sensor 74 in FIG. 11 is referred to in the art as a top tunnel junction sensor whereas the tunnel junction sensor in FIG. 10 is referred to as a bottom tunnel junction sensor. In the embodiment shown in FIG. 11 the nanolayer 204 is provided with the aforementioned smooth surface 240 which interfaces the barrier layer 200. A typical ferromagnetic material for the nanolayer 204 is cobalt iron ($Co_{90}Fe_{10}$) and a typical material for the free layer 205 is nickel iron ($Ni_{83}Fe_{17}$). The smooth surface 240 in FIG. 11 is an oxidized monolayer of the ferromagnetic material of the nanolayer 204. The smooth surface 240 is also made by the present method which is described in detail hereinafter.

It should be understood that the pinned layer 202 may alternatively be an antiparallel (AP) pinned layer structure with first and second ferromagnetic layers, such as cobalt iron ($Co_{90}Fe_{10}$), separated by a thin (i.e. 8 Å) separation layer, such as ruthenium (Ru), which is fully described in commonly assigned U.S. Pat. No. 5,768,069.

It should further be understood that while the ferromagnetic material of the pinned and free layers is preferably cobalt iron (CoFe) the invention can be practiced with other ferromagnetic materials, such as any cobalt based or nickel iron based materials.

Method of Making

Figure 12:
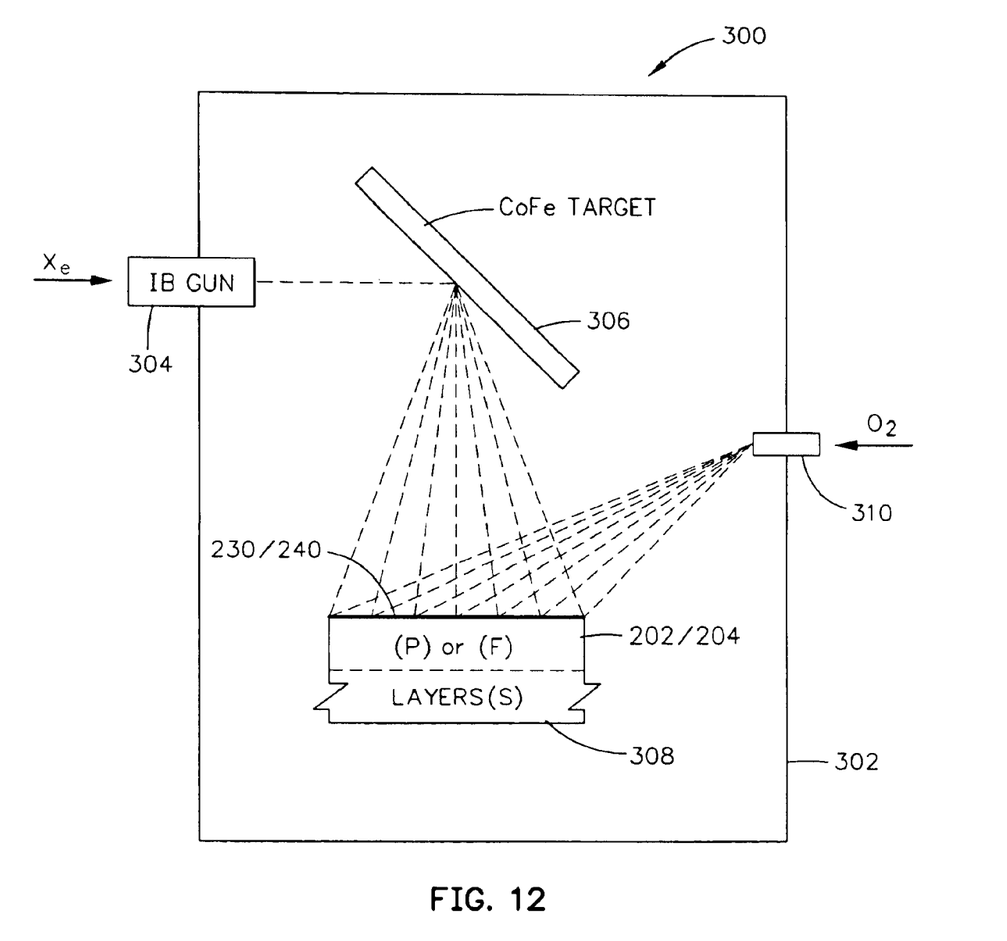
FIG. 12 is a schematic illustration of a sputtering chamber wherein a smooth surface has been obtained at the top of a pinned or free layer according to a method of the present invention.

The method of making the smooth surfaces 230 and 240 in FIGS. 10 and 11 is accomplished with a sputtering system 300 which is schematically illustrated in FIG. 12. The sputtering system 300 includes a sputtering chamber 302 through which there is located an ion beam gun 304. The ion beam gun 304 receives a noble gas, such as xenon (Xe), and accelerates xenon ions toward a target 306 which may be cobalt iron (CoFe), whether the pinned layer 202 of FIG. 10 or the free layer structure 203 is formed on previously formed one or more underlying seed layers 308, such as the seed layer 216 or a substrate (not shown). When forming the pinned layer 202 in FIG. 10 a cobalt iron ($Co_{50}Fe_{50}$) target may be employed and xenon ions are accelerated from the ion beam gun 304 to dislodge cobalt iron atoms from the target 306 which are sputter deposited to form the pinned layer 202. The sputtering chamber is then vacuumed (not shown) via opening 310 and then oxygen atoms ($O_2$) are introduced into the chamber 302 through the opening 310 which forms the smooth surface 230 in FIG. 10.

The smooth surface 230 is an oxidized monolayer of the pinned layer 202. This is accomplished by maintaining a specific low partial pressure of the oxygen ($O_2$) for a very short duration. This is to ensure that additional monolayers are not oxidized which will cause degradation of the pinned layer and a rough surface instead of the smooth surface 230. In the preferred embodiment the preferred partial pressure is $5 \times 10^{-5}$ Torr and the duration is 30 seconds.

If the free layer structure 203 in FIG. 11 is to be formed instead of the pinned layer 202 in FIG. 10 a cobalt iron ($Co_{90}Fe_{10}$) target may be employed at 306. Xenon ions are then accelerated toward the cobalt iron target which causes atoms of cobalt iron to be sputtered and deposited to form the nanolayer 204. The nanolayer 204 is then subjected to an oxygen ($O_2$) atmosphere to form a smooth surface 240 in the same manner as described hereinabove to form the smooth surface 230.

Figure 13:
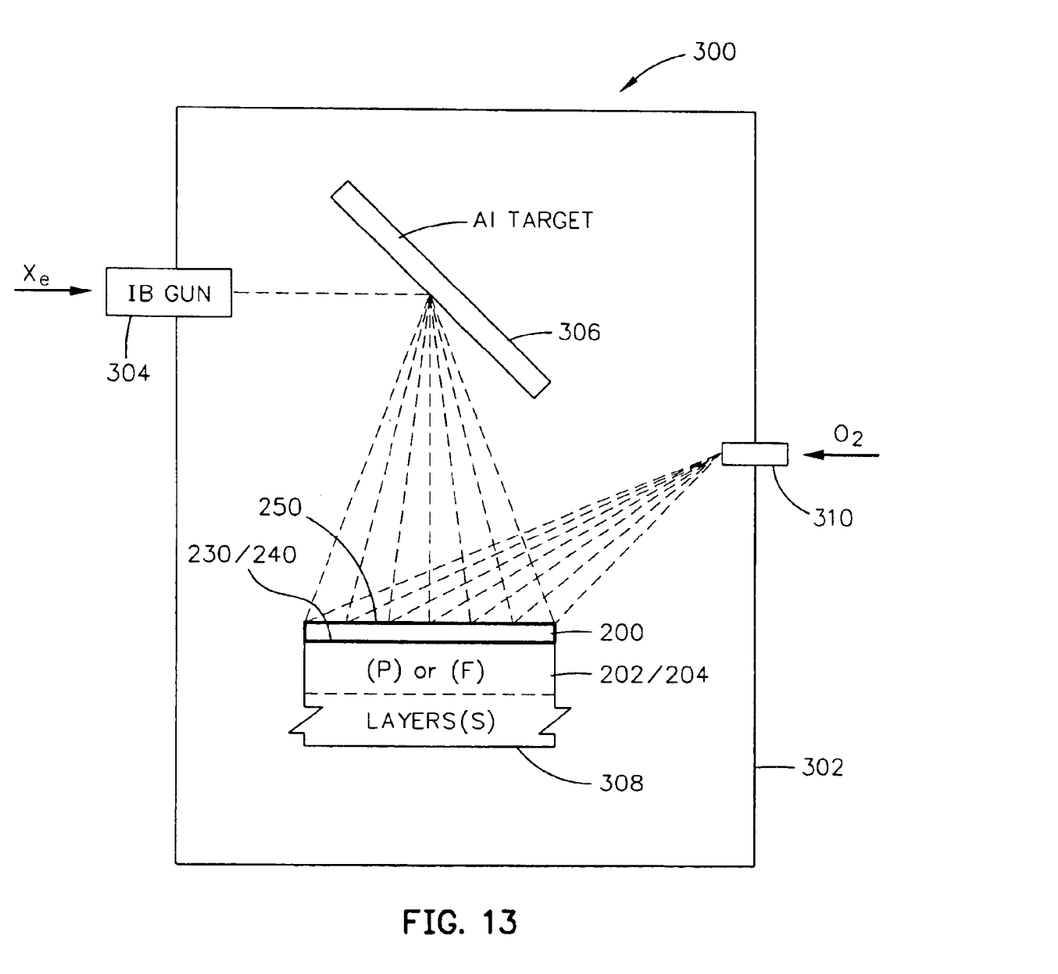
FIG. 13 is the same as FIG. 12 except a smooth surface has been obtained at the top of a partial thickness of the oxide barrier layer according to a method of the present invention.

In either embodiment (FIG. 10 or FIG. 11) the same sputtering chamber 300 is employed in FIG. 13 for forming the barrier layer 200. The target 306 for the barrier layer is aluminum. Xenon atoms sputter aluminum atoms from the target 306 which are deposited to form a partial thickness of the preoxidized barrier layer 200. A smooth surface 250 is then formed on the partial thickness of the preoxidized barrier layer by the method described hereinabove for the smooth surfaces 230 and 240. The process of providing the partial thickness of the barrier layer with a smooth surface is optional but is a preferred method of the present invention.

Figure 14:
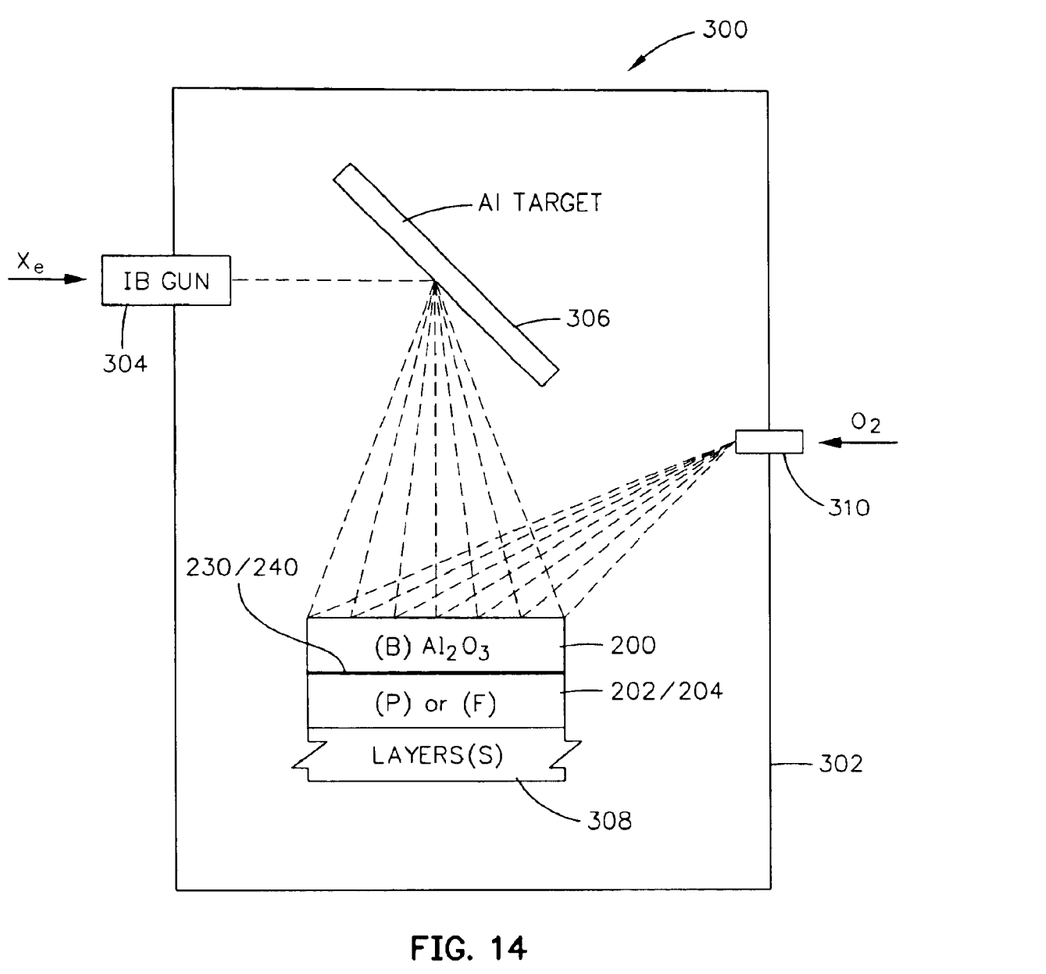
FIG. 14 is the same as FIG. 13 except the material layer has been sputter deposited to its full thickness and oxidized to form the oxide barrier layer.

In FIG. 14 the aluminum target 306 is further bombarded with xenon atoms to sputter aluminum atoms which form the remainder of the preoxidized barrier layer 200. The partial thickness deposits and oxygen exposure processes can be repeated to form the fall thickness barrier layer. The preoxidized barrier layer, which is aluminum (Al), is then exposed to an oxygen ($O_2$) atmosphere by the introduction of oxygen through the opening 310. This then forms the barrier layer of aluminum oxide ($Al_2O_3$). The smooth surfaces 230 or 240 enhance the texture of the barrier layer and the smooth surface 250 shown in FIG. 13 further enhances the texture of the barrier layer which causes a reduced coupling field between the pinned and free layers 202 and 204 in either of the embodiments shown in FIG. 10 or 11.

Discussion

Preferred materials are cobalt iron ($Co_{50}Fe_{50}$) for the pinned layer 202, nickel iron ($Ni_{83}Fe_{17}$) for the free layer 205, cobalt iron ($Co_{90}Fe_{10}$) for the nanolayer 204 and aluminum oxide ($Al_2O_3$) for the barrier layer 200. With the present invention the barrier layer can be maintained extremely thin for reducing the resistance of the tunnel junction sensor to the tunneling current ($I_T$) while reducing the magnetic coupling field between the pinned and free layers 202 and 204. A lower coupling field reduces the magnetic force which urges the magnetic moment 226 from its parallel position to the ABS in a quiescent condition of the tunnel junction sensor.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head which has an air bearing surface (ABS), comprising:
    a tunnel junction sensor including:
        a ferromagnetic pinned layer structure that has a magnetic moment;
        an antiferromagnetic pinning layer exchange coupled to the pinned layer structure for pinning the magnetic moment of the pinned layer structure;
        a ferromagnetic free layer structure which has a magnetic moment;
        a nonmagnetic electrically insulative barrier layer located between the free layer structure and the pinned layer structure; and
        the pinned layer structure or the free layer structure having an oxidized monolayer that is adjacent the barrier layer.

2. A magnetic read head as claimed in claim 1 wherein the pinned layer structure includes a cobalt based layer that has said oxidized monolayer.

3. A magnetic read head as claimed in claim 2 wherein the cobalt based layer is cobalt iron (CoFe).

4. A magnetic read head as claimed in claim 3 including:
    ferromagnetic first and second shield layers; and
    the tunnel junction sensor being located between the first and second shield layers.

5. A magnetic head assembly having an air bearing surface (ABS), comprising:
    a write head including:
        ferromagnetic first and second pole piece layers that have a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions; and a read head including:

a first shield layer;

a tunnel junction sensor located between the first shield layer and the first pole piece layer;

the tunnel junction sensor including:

a ferromagnetic pinned layer structure that has a magnetic moment;

an antiferromagnetic pinning layer structure exchange coupled to the pinned layer structure for pinning the magnetic moment of the pinned layer structure;

a ferromagnetic free layer structure which has a magnetic moment; and a nonmagnetic electrically insulative barrier layer located between the free layer structure and the pinned layer structure; and the pinned layer structure or the free layer structure having an oxidized monolayer that is adjacent the barrier layer.

6. A magnetic head assembly as claimed in claim 5 wherein the pinned layer structure includes a cobalt based layer that has said oxidized monolayer.

7. A magnetic head assembly as claimed in claim 6 wherein the cobalt based layer is cobalt iron (CoFe).

8. A magnetic head assembly as claimed in claim 7 including:

ferromagnetic first and second shield layers; and the tunnel junction sensor being located between the first and second shield layers.

9. A magnetic disk drive including at least one magnetic head assembly that has an a write head, a read head and an air bearing surface (ABS) comprising:

the write head including:

ferromagnetic first and second pole piece layers that have a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions; and the read head including:

a first shield layer;

a tunnel junction sensor located between the first shield layer and the first pole piece layer;

the tunnel junction sensor including:

a ferromagnetic pinned layer structure that has a magnetic moment;

an antiferromagnetic pinning layer exchange coupled to the pinned layer structure for pinning the magnetic moment of the pinned layer structure;

a ferromagnetic free layer structure which has a magnetic moment;

a nonmagnetic electrically insulative barrier layer located between the free layer structure and the pinned layer structure; and the pinned layer structure or the free layer structure having an oxidized monolayer that interfaces the barrier layer;

a housing;

a magnetic disk rotatably supported in the housing;

a support mounted in the housing for supporting the magnetic head assembly with said ABS facing the magnetic disk so that the magnetic head assembly is in a transducing relationship With the magnetic disk;

a spindle motor for rotating the magnetic disk;

an actuator positioning means connected to the support for moving the magnetic head assembly to multiple positions with respect to said magnetic disk; and a processor connected to the magnetic head assembly, to the spindle motor and to the actuator positioning means for exchanging signals with the magnetic head assembly, for controlling movement of the magnetic disk and for controlling the position of the magnetic head assembly.

10. A magnetic disk drive as claimed in claim 9 wherein the pinned layer structure includes a cobalt based layer that has said oxidized monolayer.

11. A magnetic disk drive as claimed in claim 10 wherein the cobalt based layer is cobalt iron (CoFe).

12. A magnetic disk drive as claimed in claim 10 including:

ferromagnetic first and second shield layers; and the tunnel junction sensor being located between the first and second shield layers.

* * * * *